(12) United States Patent
Kang et al.

(10) Patent No.: US 11,815,983 B2
(45) Date of Patent: Nov. 14, 2023

(54) COMMUNICATION ECU

(71) Applicant: LG Electronics Inc., Seoul (KR)

(72) Inventors: Byungjin Kang, Seoul (KR); Xavier Punithan, Seoul (KR); Byeongrim Jo, Seoul (KR)

(73) Assignee: LG Electronics Inc., Seoul (KR)

( * ) Notice: Subject to any disclaimer, the term of this patent is extended or adjusted under 35 U.S.C. 154(b) by 493 days.

(21) Appl. No.: 17/254,456

(22) PCT Filed: Jun. 25, 2019

(86) PCT No.: PCT/KR2019/007618
§ 371 (c)(1),
(2) Date: Dec. 21, 2020

(87) PCT Pub. No.: WO2020/004886
PCT Pub. Date: Jan. 2, 2020

(65) Prior Publication Data
US 2021/0224169 A1 Jul. 22, 2021

Related U.S. Application Data

(60) Provisional application No. 62/689,247, filed on Jun. 25, 2018.

(51) Int. Cl.
*G06F 11/07* (2006.01)
*G06F 11/20* (2006.01)

(52) U.S. Cl.
CPC ...... *G06F 11/0739* (2013.01); *G06F 11/0751* (2013.01); *G06F 11/2028* (2013.01); *G06F 2201/85* (2013.01)

(58) Field of Classification Search
CPC ............ G06F 11/0721; G06F 11/0724; G06F 11/0739; G06F 11/0751; G06F 11/2028; G06F 11/2033; G06F 2201/85
(Continued)

(56) References Cited

U.S. PATENT DOCUMENTS

2006/0161269 A1  7/2006 Staiger
2009/0195058 A1  8/2009 Jackson et al.
(Continued)

FOREIGN PATENT DOCUMENTS

| EP | 2123517 | 11/2009 |
| JP | 2015194971 | 11/2015 |
| KR | 101533081 | 7/2015 |

OTHER PUBLICATIONS

Extended European Search Report in European Appln. No. 19827122.3, dated Feb. 22, 2022, 13 pages.
(Continued)

*Primary Examiner* — Joseph R Kudirka
(74) *Attorney, Agent, or Firm* — Fish & Richardson P.C.

(57) ABSTRACT

The present disclosure relates to a communication electronic control unit (ECU) provided in a vehicle to be used for exchange of a signal with an external device, the communication ECU including a bus interface configured to exchange signals with a plurality of slave ECUs in the vehicle, a primary processor configured to perform software cloning for at least one of the plurality of slave ECUs, and a secondary processor configured to determine whether to operate, based on whether overload is applied to the primary processor.

14 Claims, 11 Drawing Sheets

(58) Field of Classification Search
USPC ..................................................... 714/10–13
See application file for complete search history.

(56) References Cited

U.S. PATENT DOCUMENTS

| | | |
|---|---|---|
| 2012/0265359 A1 | 10/2012 | Das et al. |
| 2013/0204493 A1 | 8/2013 | Ricci et al. |
| 2017/0270068 A1* | 9/2017 | Wakita ................ G06F 11/0739 |
| 2018/0046161 A1 | 2/2018 | Yhr |

OTHER PUBLICATIONS

International Search Report in International Appln. No. PCT/KR2019/007618, dated Oct. 24, 2019, 5 pages (with English translation).

* cited by examiner

FIG. 1
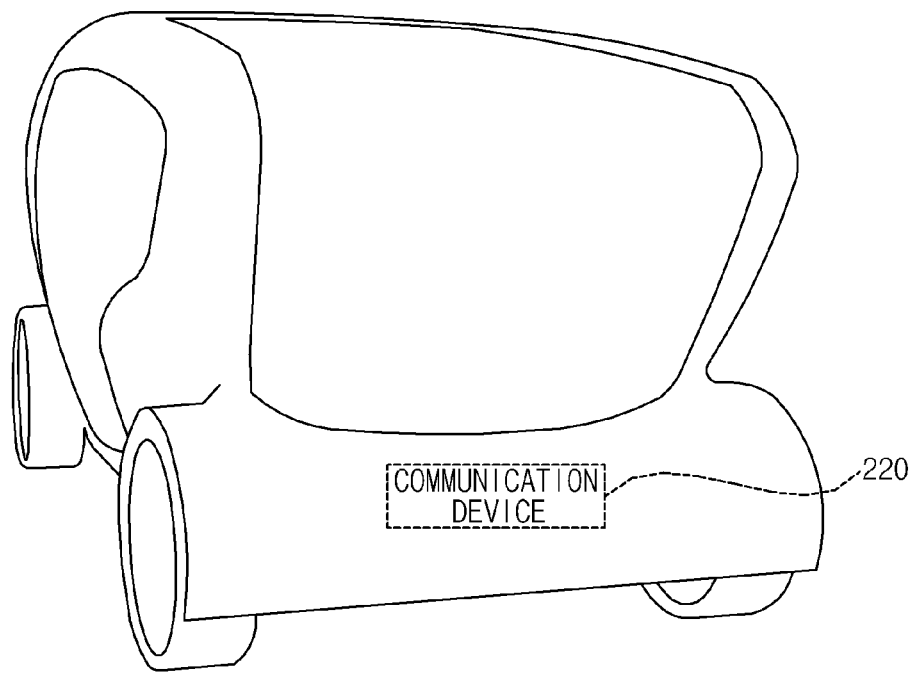
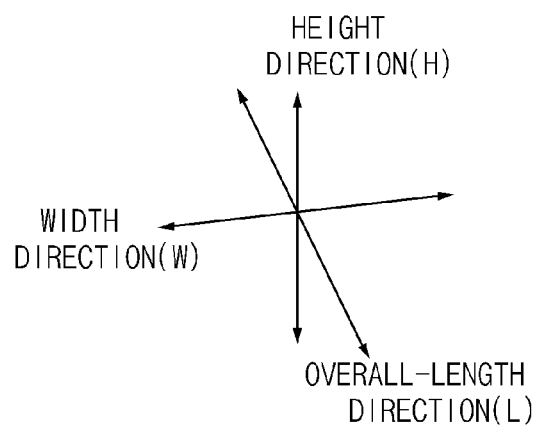

COMMUNICATION ECU

CROSS-REFERENCE TO RELATED APPLICATIONS

This application is a National Stage application under 35 U.S.C. § 371 of International Application No. PCT/KR2019/007618, filed on Jun. 25, 2019, which claims the benefit of U.S. Provisional Application No. 62/689,247, filed on Jun. 25, 2018. The disclosures of the prior applications are incorporated by reference in their entirety.

TECHNICAL FIELD

The present disclosure relates to a communication ECU.

BACKGROUND ART

A vehicle is an apparatus that a riding user moves in a desired direction. A representative example of such a vehicle may be an automobile. An autonomous vehicle means a vehicle that can automatically travel without a driving operation of a human being. The autonomous vehicle has a plurality of electronic control units (ECUs), such as an automated driving (AD) ECU, a MAP ECU, and an MMI cluster ECU. In the event of a fault in any one of the plurality of ECUs in the autonomous vehicle, autonomous driving is not smoothly performed and there is also a risk of an accident. Accordingly, when a fault occurs in any one of the plurality of ECUs in the autonomous vehicle, there is a need for an ECU to replace the faulty ECU.

DISCLOSURE

Technical Problem

Therefore, the present disclosure has been made in view of the above problems, and it is an object of the present disclosure to provide a communication ECU which implements a function of a slave ECU when a fault occurs in the slave ECU.

Objects of the present disclosure devised to solve the problems are not limited to the aforementioned objects, and other unmentioned objects will be clearly understood by those skilled in the art based on the following detailed description of the present disclosure.

Technical Solution

In accordance with an aspect of the present disclosure, the above and other objects can be accomplished by the provision of a communication electronic control unit (ECU) provided in a vehicle to exchange a signal with an external device, the communication ECU including a bus interface configured to exchange signals with a plurality of slave ECUs in the vehicle, a primary processor configured to perform software cloning for at least one of the plurality of slave ECUs, and a secondary processor configured to determine whether to operate, based on whether overload is applied to the primary processor.

It is to be understood that details of other embodiments are included in the detailed description and the accompanying drawings.

Advantageous Effects

The present disclosure provides one or more of the following effects.

Firstly, when a fault occurs in a slave ECU, a communication ECU implements a function of the slave ECU, thereby making it possible to prevent an error.

Secondly, the number of ECUs duplicated for an automated driving (AD) function is reduced, thereby making it possible to curtail an autonomous vehicle manufacturing cost.

Thirdly, it may be possible to reduce power consumption through efficient system management.

It will be appreciated by those skilled in the art that the effects of the present disclosure are not limited to those that have been particularly described hereinabove and that other unmentioned effects of the present disclosure will be more clearly understood from the accompanying claims.

DESCRIPTION OF DRAWINGS

FIG. 1 is a view showing the outer appearance of a vehicle according to an embodiment of the present disclosure.

BEST MODE

Figure 2:
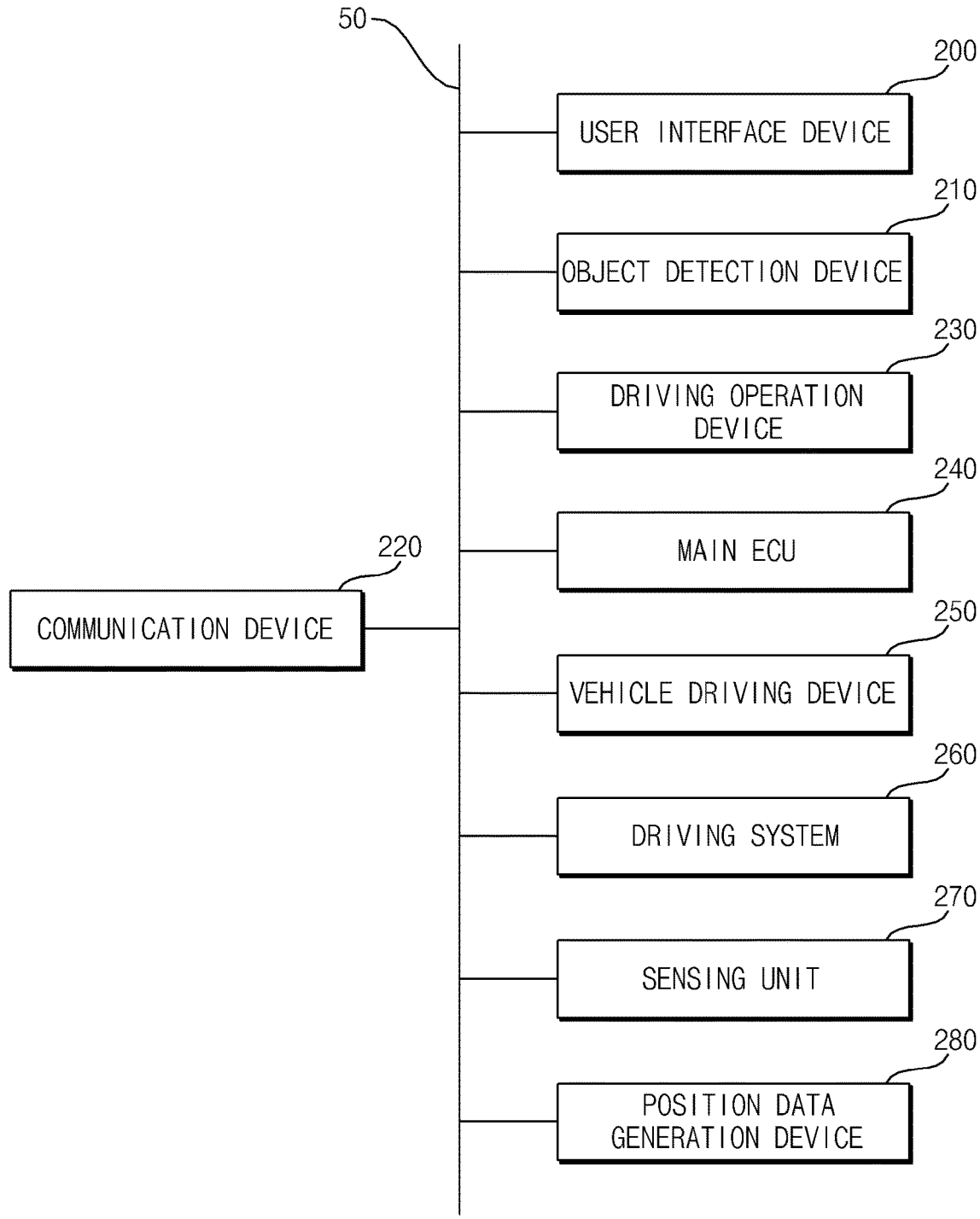
FIG. 2 is a control block diagram of a vehicle according to an embodiment of the present disclosure.

Reference will now be made in detail to the exemplary embodiments of the present disclosure, examples of which are illustrated in the accompanying drawings. Identical or similar constituent elements will be designated by the same reference numeral even though they are depicted in different drawings. The suffixes "module" and "unit" of elements herein are used for convenience of description and thus can be used interchangeably, and do not have any distinguishable meanings or functions. In the following description of the at least one embodiment, a detailed description of known functions and configurations incorporated herein will be omitted for the purpose of clarity and for brevity. The features of the present disclosure will be more clearly understood from the accompanying drawings and should not be limited by the accompanying drawings, and it is to be appreciated that all changes, equivalents, and substitutes that do not depart from the spirit and technical scope of the present disclosure are encompassed in the present disclosure.

It will be understood that, although the terms "first", "second", etc. may be used herein to describe various elements, these elements should not be limited by these terms. These terms are only used to distinguish one element from another element.

It will be understood that, when an element is referred to as being "connected to" or "coupled to" another element, it may be directly connected or coupled to the other element, or intervening elements may be present. In contrast, when an element is referred to as being "directly connected to" or "directly coupled to" another element or layer, there are no intervening elements present.

The singular expressions in the present specification include the plural expressions unless clearly specified otherwise in context.

It will be further understood that the terms "comprises" or "comprising" when used in this specification specify the presence of stated features, integers, steps, operations, elements, or components, but do not preclude the presence or addition of one or more other features, integers, steps, operations, elements, components, or combinations thereof.

FIG. 1 is a view showing a vehicle according to an embodiment of the present disclosure.

Referring to FIG. 1, the vehicle 10 according to the embodiment of the present disclosure is defined as transportation means which runs on a road or a railroad line. The vehicle 10 is a concept including an automobile, a train, and a motorcycle. The vehicle 10 may be a concept including all of an internal combustion engine vehicle having an engine as a power source, a hybrid vehicle having an engine and an electric motor as power sources, an electric vehicle having an electric motor as a power source, etc. The vehicle 10 may be a shared vehicle. The vehicle 10 may be an autonomous vehicle.

The vehicle 10 may include an electronic device 100 (미도시).

On the other hand, the vehicle 10 may interact with at least one robot. The robot may be an autonomous mobile robot (AMR) that can travel by itself. The AMR may freely move in that it is movable by itself and may travel avoiding obstacles in that it has a plurality of sensors for avoiding obstacles, etc. while traveling. The AMR may be a flying robot (for example, a drone) with a flight device. The AMR may be a wheeled robot that has at least one wheel and moves through rotation of the wheel. The AMR may be a legged robot that has at least one leg and moves using the leg.

The robot may function as a device for providing convenience to a user of the vehicle 10. For example, the robot may function to move goods loaded in the vehicle 10 to a final destination of the user. For example, the robot may function to show the user got out of the vehicle 10 the way to the final destination. For example, the robot may function to transport the user got out of the vehicle 10 to the final destination.

At least one electronic device included in the vehicle may communicate with the robot through a communication device 220.

The at least one electronic device in the vehicle may provide data processed thereby to the robot. For example, the at least one electronic device in the vehicle may provide at least one of object data, HD map data, vehicle status data, vehicle position data or driving plan data to the robot.

The at least one electronic device in the vehicle may receive data processed by the robot from the robot. The at least one electronic device in the vehicle may receive at least one of sense data, object data, robot status data, robot position data or robot moving plan data generated by the robot.

The at least one electronic device in the vehicle may generate a control signal, further based on data received from the robot. For example, the at least one electronic device in the vehicle may compare object information generated by an object detection device 210 with object information generated by the robot and generate a control signal based on a result of the comparison. The at least one electronic device in the vehicle may generate a control signal such that there is no interference between a moving path of the vehicle 10 and a moving path of the robot.

The at least one electronic device in the vehicle may include a software module or a hardware module (referred to hereinafter as an artificial intelligence module) for implementing artificial intelligence (AI). The at least one electronic device in the vehicle may input acquired data to the AI module and use data output from the AI module.

The AI module may perform machine learning for input data using at least one artificial neural network (ANN). The AI module may output the driving plan data through the machine learning for the input data.

The at least one electronic device in the vehicle may generate a control signal based on data output from the AI module.

In some embodiments, the at least one electronic device in the vehicle may receive data processed by the AI from an external device through the communication device 220. The at least one electronic device in the vehicle may generate a control signal based on the data processed by the AI.

FIG. 2 is a control block diagram of a vehicle according to an embodiment of the present disclosure.

Referring to FIG. 2, the vehicle 10 may include an electronic device 100 or the vehicle, a user interface device 200, an object detection device 210, a communication device 220, a driving operation device 230, a main ECU 240, a vehicle driving device 250, a driving system 260, a sensing unit 270, and a position data generation device 280.

The user interface device 200 is a device for communication between the vehicle 10 and a user. The user interface device 200 may receive a user input and provide information generated by the vehicle 10 to the user. The vehicle 10 may realize a user interface (UI) or user experience (UX) through the user interface device 200. The user interface device 200 may be implemented with a display device mounted to the vehicle 10, a head up display (HUD) device, a window display device, a cluster device, or the like. The user interface device 100 may include an input device, an output device, and a user monitoring device. The user interface device 200 may include an input device such as a touch input device, a mechanical input device, an audio input device or a gesture input device. The user interface device 200 may include an output device such as a speaker, a display or a haptic module. The user interface device 200 may include a user monitoring device such as a driver monitoring system (DMS) or an internal monitoring system (IMS).

The object detection device 210 may detect an object outside the vehicle 10. The object detection device 210 may include at least one sensor capable of detecting an object outside the vehicle 10. The object detection device 210 may include at least one of a camera, a radar, a lidar, an ultrasonic sensor or an infrared sensor. The object detection device 210 may provide data about an object generated based on a sense signal generated by the sensor to at least one electronic device included in the vehicle.

The camera may generate information about an object outside the vehicle 10 using an image. The camera may include at least one lens, at least one image sensor, and at least one processor which is electrically connected to the image sensor to process a received signal and generate data about an object based on the processed signal.

The camera may be at least one of a mono camera, a stereo camera or an around view monitoring (AVM) camera. The camera may acquire position information of an object, distance information with the object or relative speed information with the object using a variety of image processing algorithms. For example, the camera may acquire, from an acquired image, the distance information and relative speed information with the object based on a variation in size of the object with time. For example, the camera may acquire the distance information and relative speed information with the object through a pin hole model, road surface profiling, etc. For example, the camera may acquire, from a stereo image acquired by the stereo camera, the distance information and relative speed information with the object based on disparity information.

The camera may be mounted at a position of the vehicle at which a field of view (FOV) is securable, in order to image the outside of the vehicle. The camera may be disposed in the interior of the vehicle in proximity to a front windshield to acquire a front image of the vehicle. The camera may be disposed around a front bumper or a radiator grille. The camera may be disposed in the interior of the vehicle in proximity to a rear glass to acquire a rear image of the vehicle. The camera may be disposed around a rear bumper, a trunk or a tailgate. The camera may be disposed in the interior of the vehicle in proximity to at least one side window to acquire a side image of the vehicle. Alternatively, the camera may be disposed around a side mirror, a fender or a door.

The radar may generate information about an object outside the vehicle 10 using radio waves. The radar may include a radio transmitter, a radio receiver, and at least one processor which is electrically connected to the radio transmitter and the radio receiver to process a received signal and generate data about an object based on the processed signal. The radar may be implemented using a pulse radar scheme or a continuous wave radar scheme in terms of the radio emission principle. In the continuous wave radar scheme, the radar may be implemented using a frequency modulated continuous wave (FMCW) scheme or a frequency shift keyong (FSK) scheme according to a signal waveform. The radar may detect an object based on a time of flight (TOF) scheme or a phase-shift scheme via radio waves and detect the position of the detected object and the distance and relative speed with the detected object. The radar may be disposed at an appropriate position outside of the vehicle to detect an object located in front, rear or side of the vehicle.

The lidar may generate information about an object outside the vehicle 10 using laser light. The lidar may include an optical transmitter, an optical receiver, and at least one processor which is electrically connected to the optical transmitter and the optical receiver to process a received signal and generate data about an object based on the processed signal. The lidar may be implemented using the time of flight (TOF) scheme or the phase-shift scheme. The lidar may be implemented in a driven manner or a non-driven manner. In the case of being implemented in the driven manner, the lidar may detect an object around the vehicle 10 while being rotated by a motor. In the case of being implemented in the non-driven manner, the lidar may detect an object located within a predetermined range about the vehicle by optical steering. The vehicle 100 may include a plurality of non-driven lidars. The lidar may detect an object based on the time of flight (TOF) scheme or the phase-shift scheme via laser light and detect the position of the detected object and the distance and relative speed with the detected object. The lidar may be disposed at an appropriate position outside of the vehicle to detect an object located in front, rear or side of the vehicle.

The communication device 220 may exchange a signal with a device located outside the vehicle 10. The communication device 220 may exchange a signal with at least one of infrastructure (for example, a server or a broadcasting station) or another vehicle. In order to perform communication, the communication device 220 may include at least one of a transmission antenna, a reception antenna, a radio frequency (RF) circuit or an RF element capable of implementing various communication protocols.

The communication device 220 may communicate with a device located outside the vehicle 10 using a 5G (for example, new radio (NR)) scheme. The communication device 220 may implement V2X (V2V, V2D, V2P or V2N) communication using the 5G scheme.

The driving operation device 230 is a device which receives a user input for driving. In a manual mode, the vehicle 10 may be driven based on a signal provided by the driving operation device 230. The driving operation device 230 may include a steering input device (for example, a steering wheel), an acceleration input device (for example, an accelerator pedal), and a brake input device (for example, a brake pedal).

The main ECU 240 may control the overall operation of at least one electronic device included in the vehicle 10.

The driving control device 250 is a device which electrically controls a variety of vehicle driving devices in the vehicle 10. The driving control device 250 may include a powertrain driving control device, a chassis driving control device, a door/window driving control device, a safety device driving control device, a lamp driving control device, and an air conditioner driving control device. The powertrain driving control device may include a power source driving control device and a transmission driving control device. The chassis driving control device may include a steering driving control device, a brake driving control device, and a suspension driving control device.

On the other hand, the safety device driving control device may include a safety belt driving control device for safety belt control.

The vehicle driving control device 250 may be referred to as a control electronic control unit (ECU).

The driving system 260 may generate a signal for control of motion of the vehicle 10 or output of information to the user based on data about an object received from the object detection device 210. The driving system 260 may provide the generated signal to at least one of the user interface device 200, the main ECU 240 or the vehicle driving device 250.

The driving system 260 may be a concept including an ADAS. The ADAS 260 may embody at least one of an adaptive cruise control (ACC) system, an autonomous emergency braking (AEB) system, a forward collision warning (FCW) system, a lane keeping assist (LKA) system, a lane change assist (LCA) system, a target following assist (TFA) system, a blind spot detection (BSD) system, an adaptive high beam assist (HBA) system, an auto parking system (APS), a pedestrian (PD) collision warning system, a traffic sign recognition (TSR) system, a traffic sign assist (TSA) system, a night vision (NV) system, a driver status monitoring (DSM) system, or a traffic jam assist (TJA) system.

The driving system 260 may include an autonomous driving electronic control unit (ECU). The autonomous driving ECU may set an autonomous driving path based on data received from at least one of other electronic devices in the vehicle 10. The autonomous driving ECU may set an autonomous driving path based on data received from at least one of the user interface device 200, the object detection device 210, the communication device 220, the sensing unit 270, or the position data generation device 280. The autonomous driving ECU may generate a control signal such that the vehicle 10 travels along the autonomous driving path. The control signal generated from the autonomous driving ECU may be provided to at least one of the main ECU 240 or the vehicle driving device 250.

The sensing unit 270 may sense the status of the vehicle. The sensing unit 270 may include at least one of an inertial navigation unit (IMU) sensor, a collision sensor, a wheel sensor, a speed sensor, a slope sensor, a weight sensor, a heading sensor, a position module, a vehicle forward/backward movement sensor, a battery sensor, a fuel sensor, a tire sensor, a steering wheel rotation-based steering sensor, an in-vehicle temperature sensor, an in-vehicle humidity sensor, an ultrasonic sensor, an illumination sensor, an accelerator pedal position sensor, or a brake pedal position sensor. On the other hand, the inertial navigation unit (IMU) sensor may include at least one of an acceleration sensor, a gyro sensor, or a magnetic sensor.

The sensing unit 270 may generate vehicle status data based on a signal generated from at least one sensor. The sensing unit 270 may acquire sense signals about vehicle posture information, vehicle motion information, vehicle yaw information, vehicle roll information, vehicle pitch information, vehicle collision information, vehicle direction information, vehicle angle information, vehicle speed information, vehicle acceleration information, vehicle inclination information, vehicle forward/backward movement information, battery information, fuel information, tire information, vehicle lamp information, in-vehicle temperature information, in-vehicle humidity information, a steering wheel rotation angle, an illumination outside the vehicle, a pressure applied to an accelerator pedal, a pressure applied to a brake pedal, etc.

The sensing unit 270 may further include an accelerator pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), etc.

The sensing unit 270 may generate vehicle status information based on sense data. The vehicle status information may be information generated based on data sensed by a variety of sensors included in the vehicle.

For example, the vehicle status information may include vehicle posture information, vehicle speed information, vehicle inclination information, vehicle weight information, vehicle direction information, vehicle battery information, vehicle fuel information, vehicle tire air pressure information, vehicle steering information, in-vehicle temperature information, in-vehicle humidity information, pedal position information, and vehicle engine temperature information.

Meanwhile, the sensing unit may include a tension sensor. The tension sensor may generate a sense signal based on a tension state of a safety belt.

The position data generation device 280 may generate position data of the vehicle 10. The position data generation device 280 may include at least one of a global positioning system (GPS) or a differential global positioning system (DGPS). The position data generation device 280 may generate position data of the vehicle 10 based on a signal generated from at least one of the GPS or the DGPS. In some embodiments, the position data generation device 280 may correct position data based on at least one of an inertial measurement unit (IMU) of the sensing unit 270 or a camera of the object detection device 210.

The position data generation device 280 may be referred to as a positioning device. The position data generation device 280 may be referred to as a global navigation satellite system (GNSS).

The vehicle 10 may include an inner communication system 50. A plurality of electronic devices included in the vehicle 10 may exchange signals via the inner communication system 50. Data may be included in the signals. The inner communication system 50 may utilize at least one communication protocol (for example, CAN, LIN, FlexRay, MOST, USB or Ethernet).

Figure 3:
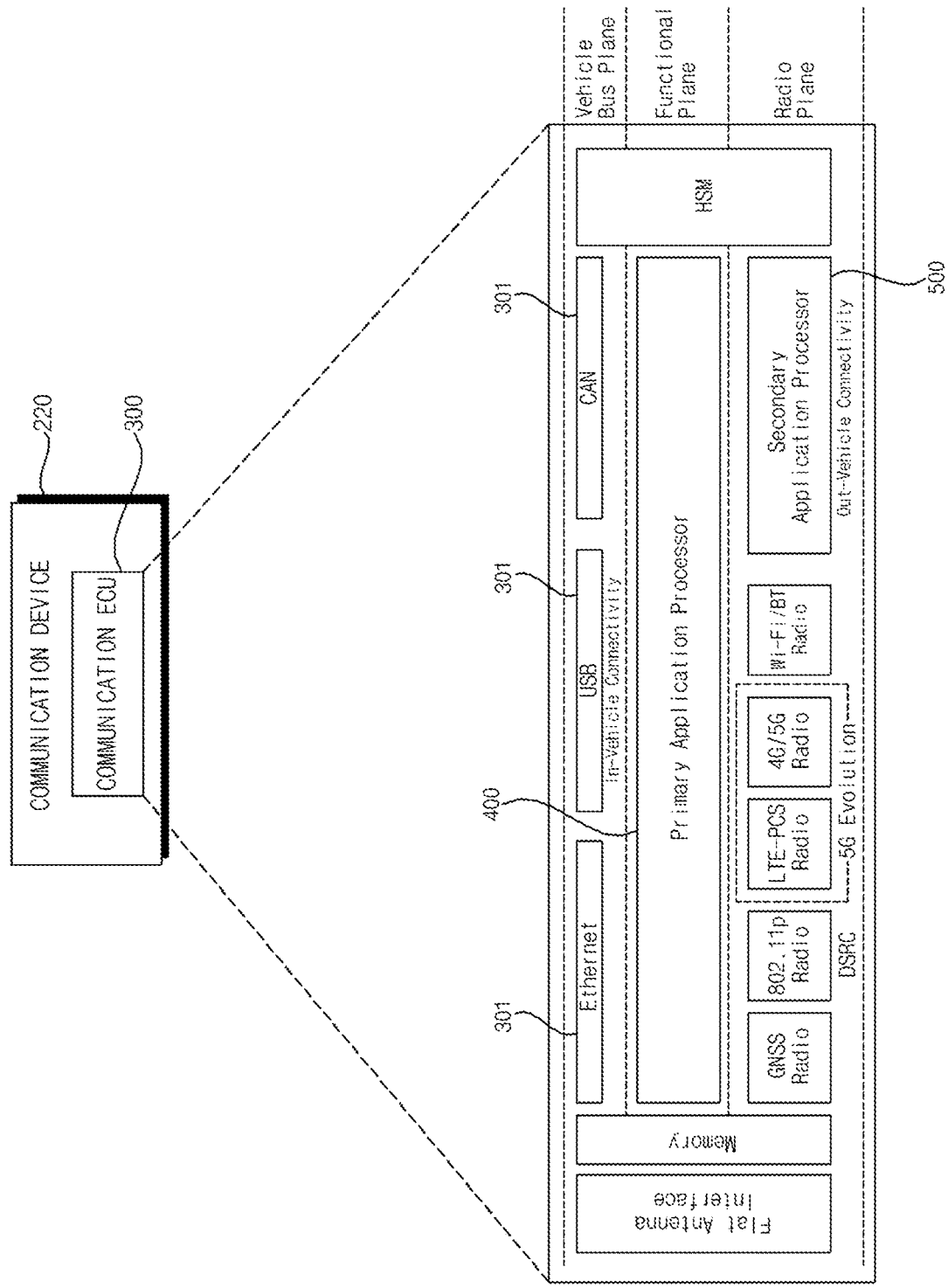
FIG. 3 is a hardware block diagram of a communication ECU according to an embodiment of the present disclosure.

FIG. 3 is a hardware block diagram of a communication ECU according to an embodiment of the present disclosure.

Figure 4:
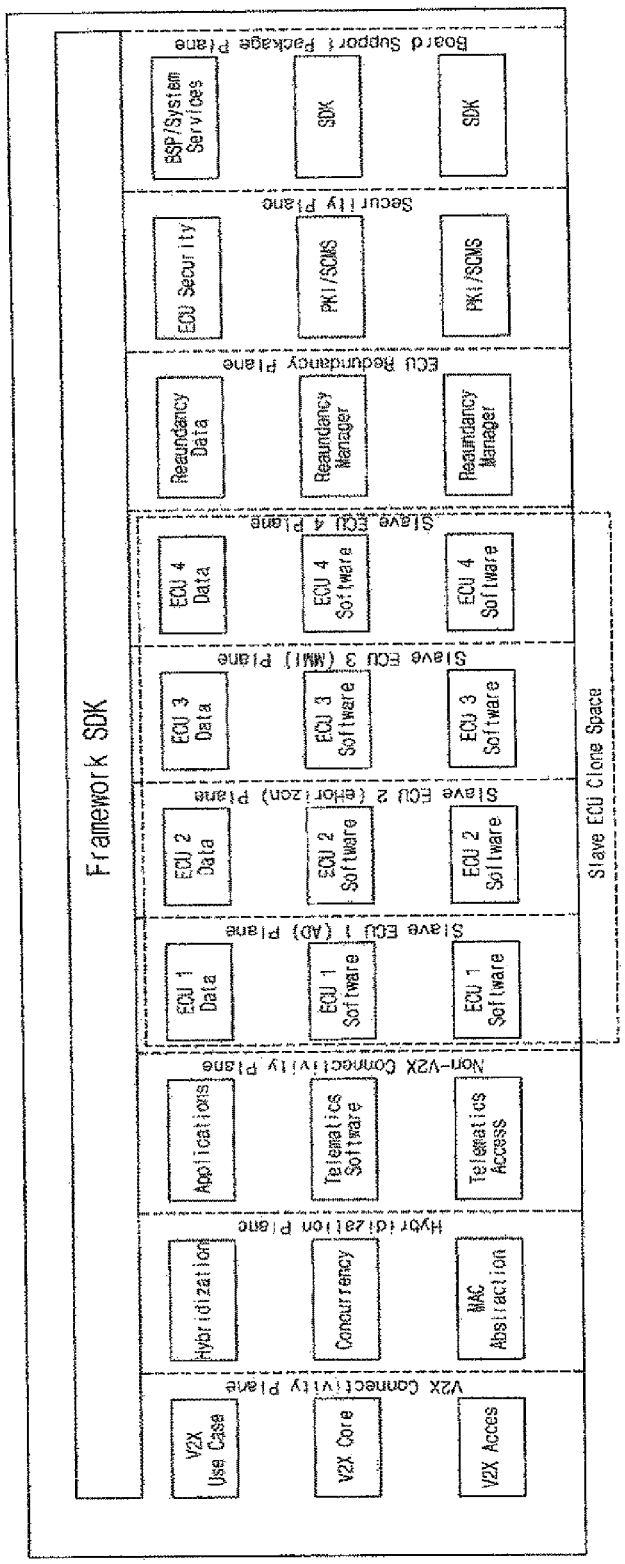
FIG. 4 is a software block diagram of a communication ECU according to an embodiment of the present disclosure.

FIG. 4 is a software block diagram of a communication ECU according to an embodiment of the present disclosure.

Figure 5:
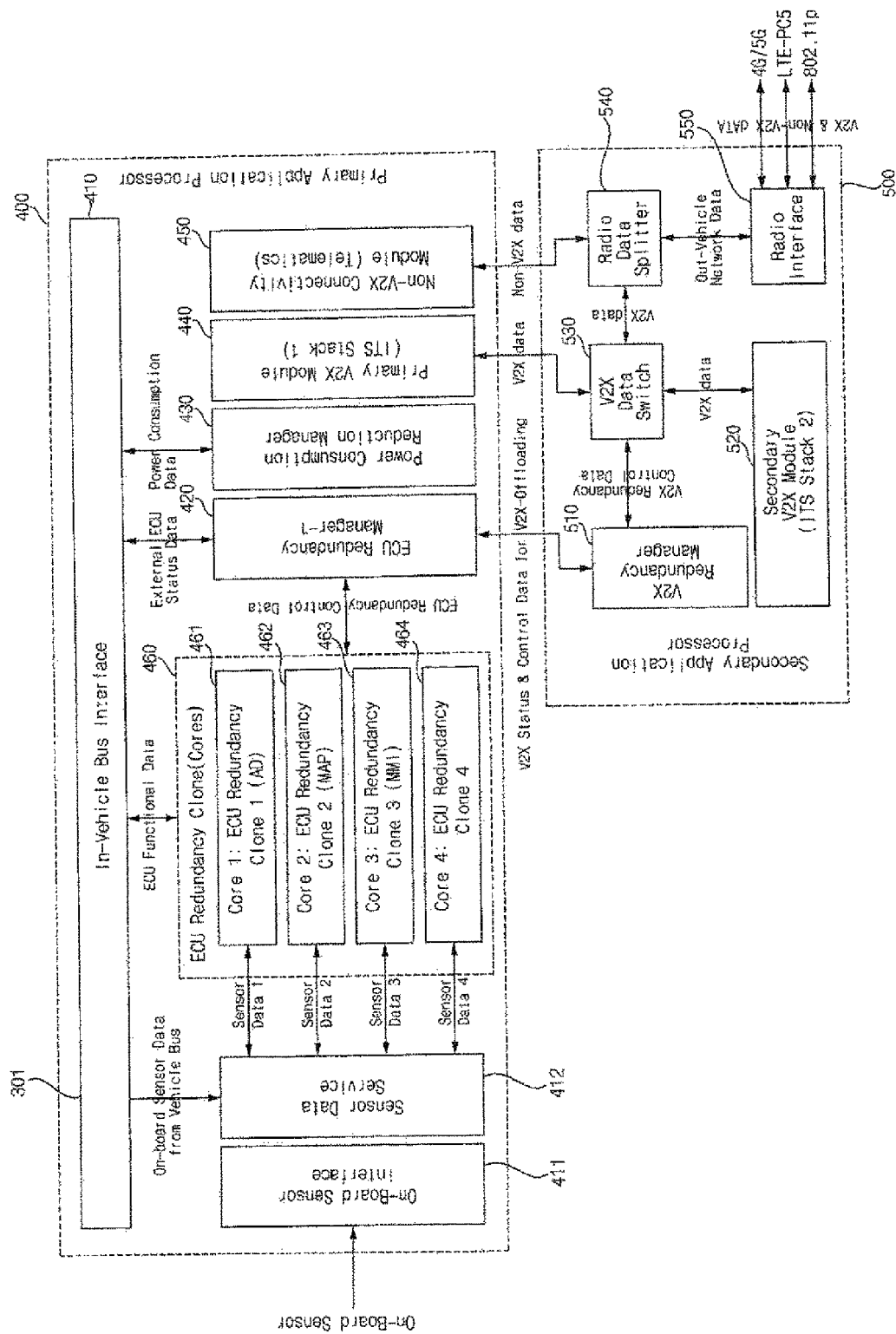
FIG. 5 is a block diagram of a primary processor and a secondary processor according to an embodiment of the present disclosure.

FIG. 5 is a block diagram of a communication ECU according to an embodiment of the present disclosure.

Referring to FIGS. 3 to 5, the communication device 220 may include a communication electronic control unit (ECU) 300. The communication ECU 300 may be provided in the vehicle 10 to be used for exchange of a signal with an external device. The external device may include any one of another vehicle, a server and a user terminal.

The communication ECU 300 essentially includes a configuration for communication with the external device. For example, the communication ECU 300 may essentially include a configuration for implementation of a communication scheme such as 802.11p, LTE, Wi-Fi or BT. This communication ECU can replace another ECU, whereas the other ECU cannot replace the communication ECU in that it includes no configuration for communication with the external device. For this reason, the communication ECU 300 is appropriate to perform software cloning for a slave ECU.

In view of hardware, the communication device 220 may include a bus interface 301, a primary processor 400, a secondary processor 500, a flat antenna interface, a memory, a hardware security module (HSM), a GNSS radio, an 802.11p radio, an LTE-PCS radio, a 4G/5G radio, and a Wi-Fi/BT radio. In view of software, the communication device 220 may include a vehicle to everything connectivity plane, a hybridization plane, a non-V2X connectivity plane, a slave ECU clone space, an ECU redundancy plane, a security plane, and a board support package plane.

The communication ECU 300 may include the bus interface 301, the primary processor 400, and the secondary processor 500.

On the other hand, the communication ECU 300 may be referred to as a master ECU.

The bus interface 301 may exchange signals with a plurality of slave ECUs in the vehicle 10. The bus interface 301 may exchange the signals with the plurality of slave ECUs through at least one of a CAN, LIN, FlexRay, MOST, USB or Ethernet communication scheme.

The slave ECU may be understood as an ECU included in the user interface device 200, the object detection device 210, the driving operation device 230, the main ECU 240, the vehicle driving device 250, the driving system 260, the sensing unit 270, or the position data generation device 280. For example, the slave ECU may be an automated driving (AD) ECU, a MAP ECU or an MMI cluster ECU.

The slave ECU is software-oriented. The communication ECU can run software of the slave ECU by a processor to execute a task of the slave ECU, whereas the slave ECU cannot perform a communication function of the communication ECU.

The bus interface 301 may receive a plurality of sensor signals input respectively to the plurality of slave ECUs. For example, the bus interface 301 may receive a first sensor signal input to a first slave ECU. The bus interface 301 may receive a second sensor signal input to a second slave ECU.

The bus interface 301 may provide the received sensor signals to a plurality of cores 460. The bus interface 301 may provide the first sensor signal to a first core 461. The bus interface 301 may provide the second sensor signal to a second core 462.

The primary processor 400 may perform software cloning for at least one of the plurality of slave ECUs. The software cloning may be defined as activating the plurality of cores allocated respectively to the plurality of slave ECUs. The plurality of cores may be included in the primary processor 400 and implement the same softwares as those of the plurality of slave ECUs. On the other hand, in this specification, software may be understood as a concept including firmware.

The primary processor 400 may perform the software cloning for a slave ECU in which a fault is detected among the plurality of slave ECUs. For example, when a fault is detected in the first slave ECU among the plurality of slave ECUs, the processor 170 may activate the first core allocated to the first slave ECU. First software which is the same as first software of the first slave ECU may be installed in the first core. The activated first core may perform a function of the first slave ECU.

The primary processor 400 may include the plurality of cores 400, an on-board sensor interface 411, a sensor data service 412, an ECU redundancy manager 420, a power consumption reduction manager 430, a primary V2X module 440, and a non-V2X connectivity module 450.

The primary processor 400 may include the plurality of cores 460 set to perform functions performed respectively by the plurality of slave ECUs. The plurality of cores 460 may be referred to as ECU redundancy clones. The plurality of cores 460 may replicate functional elements of the plurality of slave ECUs.

The primary processor 400 may include the first core 461 and the second core 462. The first core 461 may be set to perform a function performed by the first slave ECU among the plurality of slave ECUs. The second core 462 may be set to perform a function performed by the second slave ECU among the plurality of slave ECUs.

The primary processor 400 may activate the first core 461 when a fault of the first slave ECU among the plurality of slave ECUs is detected. The first core 461 may be a core allocated to perform the same function as that of the first slave ECU upon being activated as an application of the first slave ECU is installed therein. When the fault of the first slave ECU is detected, the primary processor 400 may change the first slave ECU to a state of a sleep mode. In the sleep mode, the first slave ECU is deactivated and thus stopped in operation.

The primary processor 400 may activate the second core 462 when a fault of the second slave ECU among the plurality of slave ECUs is detected. The second core 462 may be a core allocated to perform the same function as that of the second slave ECU upon being activated as an application of the second slave ECU is installed therein. When the fault of the second slave ECU is detected, the primary processor 400 may change the second slave ECU to the sleep mode state. In the sleep mode, the second slave ECU is deactivated and thus stopped in operation.

The plurality of cores 460 included in the primary processor 400 may be set to any one of a sleep mode, a monitoring mode, a semi-running mode and a running mode. The sleep mode may be defined as a mode of an inactive state of the core. The monitoring mode may be defined as a mode of monitoring the state of a matched ECU. The semi-running mode may be defined as a mode of performing only a specified algorithm. The running mode may be defined as a mode of performing the same function as that of the matched slave ECU. For example, the first core may be set to any one of the sleep mode defined as the inactive state of the first core 861, the monitoring mode of monitoring the state of the first slave ECU, the semi-running mode of performing only the specified algorithm, and the running mode of performing the same function as that of the first slave ECU. For example, the second core 862 may be set to any one of the sleep mode defined as the inactive state of the second core, the monitoring mode of monitoring the state of the second slave ECU, the semi-running mode of performing only the specified algorithm, and the running mode of performing the same function as that of the second slave ECU.

The on-board sensor interface 411 may receive data from on-board sensors. Here, the on-board sensors may be understood as the sensors included in the above-stated sensing unit 270.

The sensor data service 412 may provide sensor data required for the functions of the plurality of slave ECUs.

The ECU redundancy manager 420 may manage software cloning operations for the plurality of slave ECUs. The ECU redundancy manager 420 may monitor the states of the plurality of slave EUCs connected to the bus interface 301. The ECU redundancy manager 420 may activate or deactivate at least one of the plurality of cores 460.

The power consumption reduction manager 430 may monitor power consumption states of the plurality of slave ECUs. The power consumption reduction manager 430 may provide control information of the slave ECUs to the ECU redundancy manager 420 to reduce power consumption.

The primary V2X module 440 may perform a communication-associated function when overload is not applied to the primary processor 400. The primary V2X module 440 may be an ITS stack (ITS-G5 and WAVE) including use cases and applications.

The non-V2X connectivity module 450 is a protocol stack set which takes charge of connectivity to application programs other than V2X, such as telematics and Wi-Fi.

On the other hand, the primary processor 400 may operate in at least one of a non-distributed mode, a fully-distributed mode, a semi-distributed mode or a redundant mode.

In the non-distributed mode, the primary processor 400 may change the plurality of slave ECUs to the sleep mode and perform all of the functions of the plurality of slave ECUs.

In the fully-distributed mode, the primary processor 400 may execute only a specified function by the first core 461 among the plurality of cores 460 and hold the other cores in any one of the sleep mode, the monitoring mode and the semi-running mode.

In the semi-distributed mode, the primary processor 400 may change at least one of the plurality of slave ECUs to the sleep mode and perform the function of the slave ECU changed to the sleep mode.

In the redundant mode, the primary processor 400 may hold at least one of the plurality of cores 460 in the running mode under the condition that the plurality of slave ECUs operate.

The secondary processor 500 may determine whether to operate, based on whether overload is applied to the primary processor 400.

The secondary processor 500 may include a vehicle to everything (V2X) redundancy manager 510, a secondary V2X module 520, a V2X data switch 530, a radio data splitter 540, and a radio interface 550.

The V2X redundancy manager 510 may manage a load of the primary processor 400.

The V2X redundancy manager 510 may monitor the load of the primary processor 400. The V2X redundancy manager 510 may perform the management such that the secondary processor 500 performs a communication-associated function of exchanging a signal with an external device, on behalf of the primary processor 400, when overload is applied to the primary processor 400.

The V2X redundancy manager 510 may perform the management such that the primary processor 400 performs the communication-associated function when the overload to the primary processor 400 is resolved.

The secondary V2X module 520 may instead perform the operation of the primary V2X module 440 when overload is applied to the primary processor 400. The same application as that of the primary V2X module 440 may be installed in the secondary V2X module 520. The secondary V2X module 520 may be an ITS stack (ITS-G5 and WAVE) including use cases and applications.

The V2X data switch 530 may control a flow of V2X data between the primary processor 400 and the secondary processor 500. The V2X data switch 530 may control a flow of V2X data between the primary V2X module 440 and the secondary V2X module 520.

The radio data splitter 540 may split V2X data and non-V2X data from each other. For example, the radio data splitter 540 may split V2X data and non-V2X data from each other in telematics or network operation.

The radio interface 550 may take charge of connectivity with an external device. The radio interface 550 may take charge of connectivity with an external device using any one of 802.11p, LTE-PC5/Uu and 4G/5G networks.

FIGS. 6 to 11 are views referred to for description of a communication ECU according to an embodiment of the present disclosure.

Figure 6:
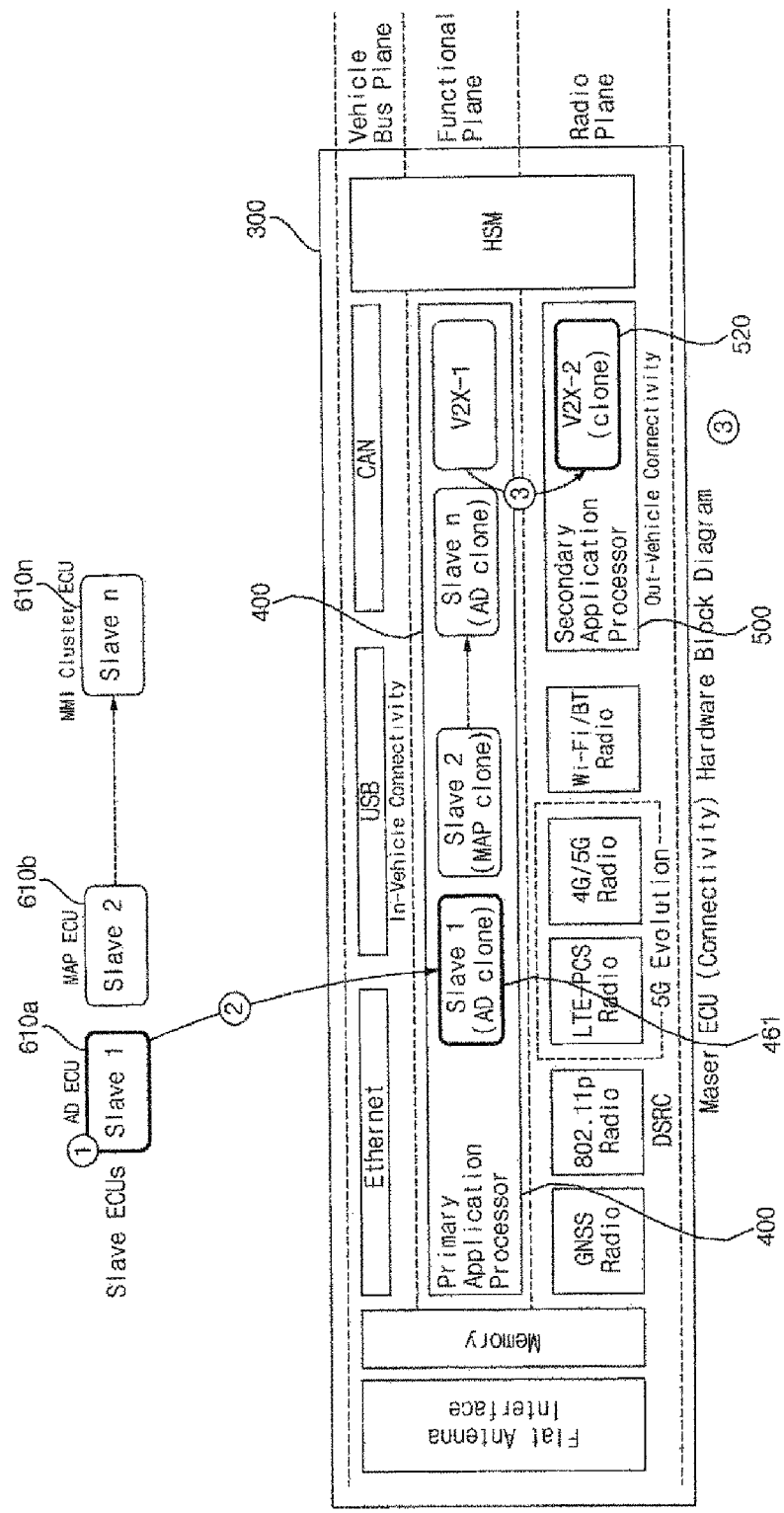
FIGS. 6 to 11 are views referred to for description of a communication ECU according to an embodiment of the present disclosure.

Referring to FIG. 6, a first slave ECU 610a among a plurality of slave ECUs 610a, 610b, . . . , 610c may fail. For example, the first slave ECU 610a may be an AD ECU.

The communication ECU 300 may sense the failed state of the first slave ECU 610a through a connection bus in the vehicle 10. The communication ECU 300 may take charge of a function of the first slave ECU 610a by executing a clone function for the first slave ECU 610a. The communication ECU 300 may activate the first core 461 in which an application of the first slave ECU 610a may be implemented. In this case, a function of the AD ECU may be implemented in the communication ECU 300.

The primary processor 400 included in the communication ECU 300 may perform the function of the first slave ECU 610a. In the case where overload occurs in the primary processor 400 due to performing the function of the first slave ECU 610a, the secondary processor 500 included in the communication ECU 300 may instead perform a communication function of the primary processor 400.

Provided that the overload in the primary processor 400 is reduced, the primary processor 400 may perform the communication function thereof.

The primary processor 400 may perform the function of the first slave ECU 610a and the communication function at the same time.

Figure 7:
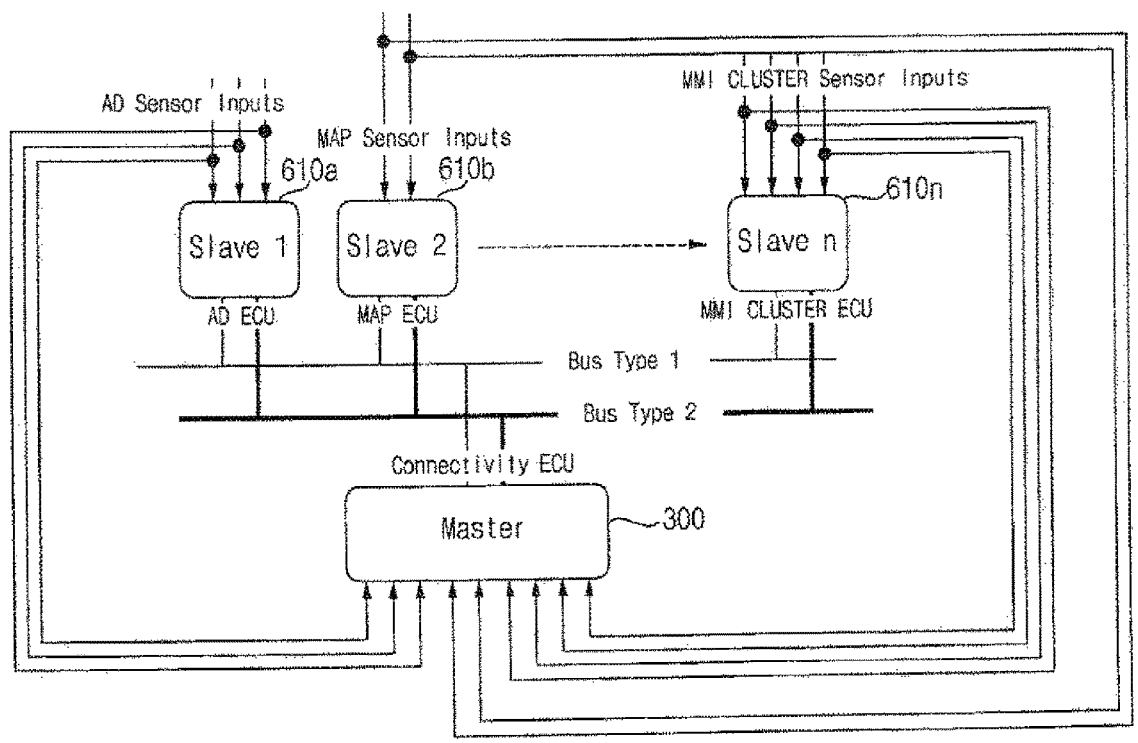

Referring to FIG. 7, each of the plurality of slave ECUs 610a, 610b, . . . , 610n may be connected to a sensor, which provides an input appropriate to an algorithm and software, wirelessly or by wire to perform a function allocated thereto.

Each of the plurality of slave ECUs 610a, 610b, . . . , 610n may be connected to the sensor physically or through a CAN or Ethernet bus.

The sensor inputs to the plurality of slave ECUs 610a, 610b, . . . , 610n may be connected in parallel to the communication ECU 300. That is, the communication ECU 300 may simultaneously acquire the sensor inputs to the plurality of slave ECUs 610a, 610b, . . . , 610n using a parallel connection circuit.

Figure 8:
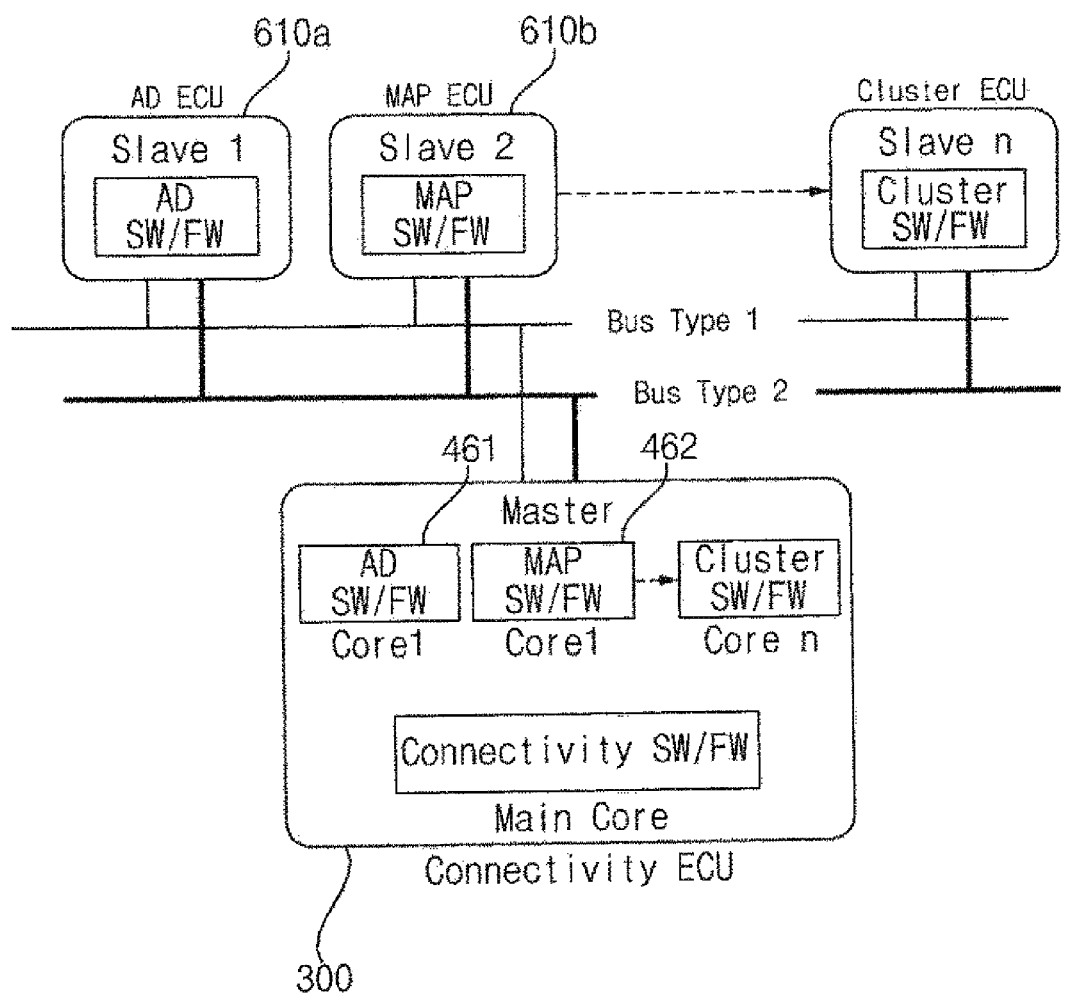

Referring to FIG. 8, the communication ECU 300 has a very powerful application processor which assists a multi-core architecture. The communication ECU 300 may include the primary processor 400 which assists the multi-core architecture.

A multi-core included in the primary processor 400 may be matched to the plurality of slave ECUs, and each core thereof may be allocated a task of running the same software (including firmware) as that of a functionally matched slave ECU. Each of the plurality of cores has a copy of the matched slave ECU. For example, the first core 461 may have an application copy of the first slave ECU 610a and the second core 462 may have a copy of the second slave ECU 610b.

Figure 9:
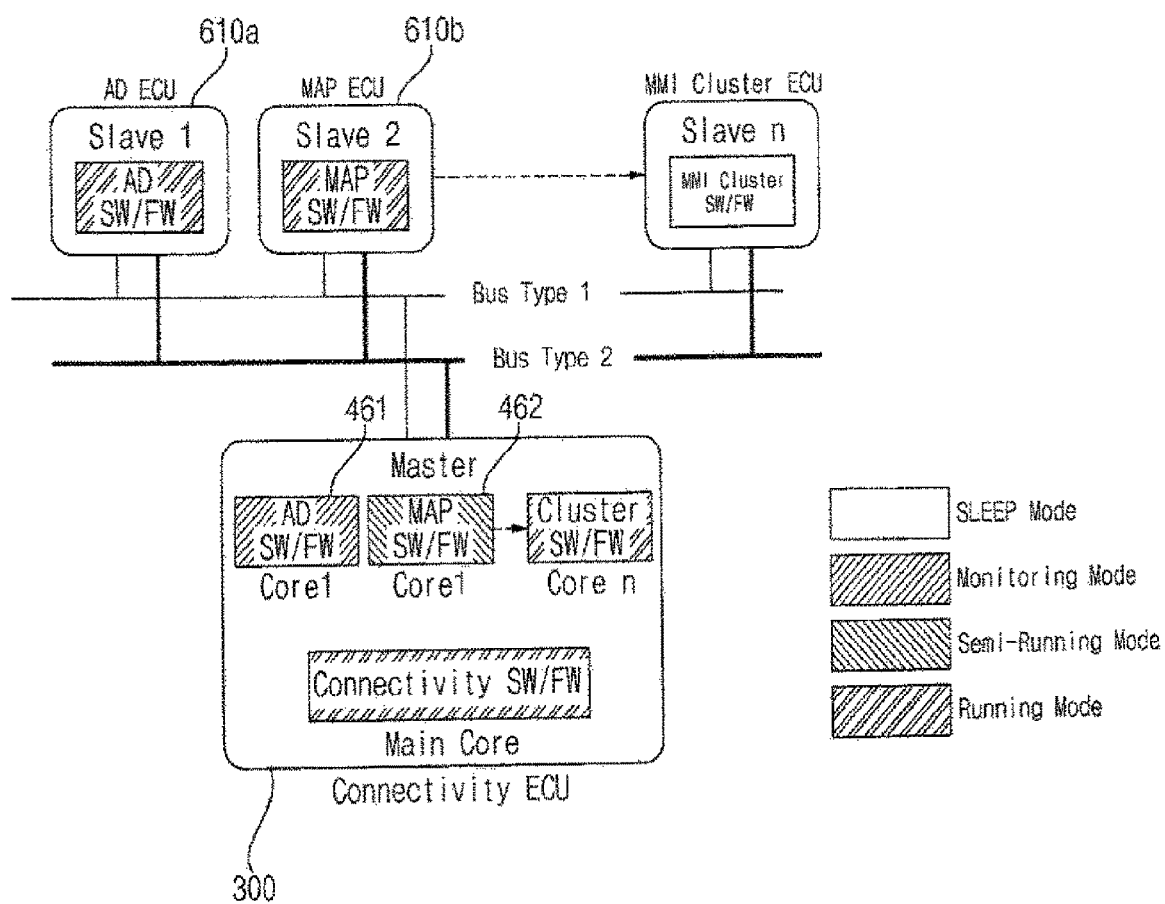

Referring to FIG. 9, each of the plurality of cores 460 may operate in any one of the sleep mode, the monitoring mode, the semi-running mode and the running mode.

In the sleep mode, the core is completely turned off and does not process software (including firmware) for a task of a matched slave ECU.

In the monitoring mode, the core is activated and monitors the state of the matched slave ECU through a bus (for example, CAN or Ethernet). In the monitoring mode, the core collects a sensor input to the matched slave ECU, but does not process the sensor input.

In the semi-running mode, the core monitors the state of the matched slave ECU and collects the sensor input to the matched slave ECU. In the semi-running mode, the core executes only a specified function or algorithm.

In the running mode, the core may run the entire software (including firmware) of the matched slave ECU and execute the same task as that of the slave ECU.

Figure 10:
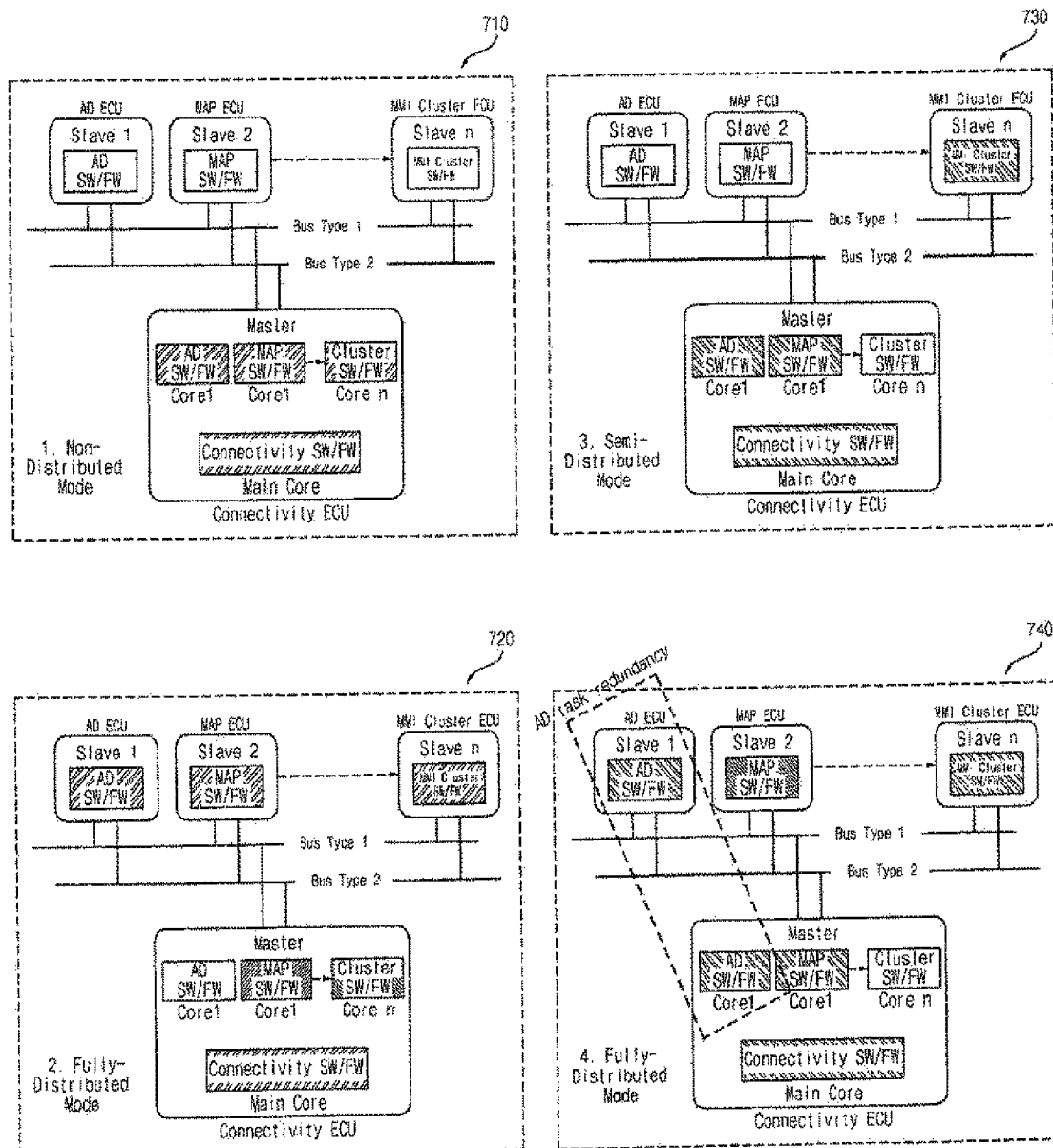

Referring to FIG. 10, the communication ECU 300 may operate in at least one of a non-distributed mode 710, a fully-distributed mode 720, a semi-distributed mode 730 or a redundant mode 740 based on data received from the object detection device 210. For example, the communication ECU 300 may operate in at least one of the non-distributed mode 710, the fully-distributed mode 720, the semi-distributed mode 730 or the redundant mode 740 based on a variety of input conditions such as a road situation, a traffic situation and a network situation.

In the non-distributed mode 710, the communication ECU 300 turns off all of the plurality of slave ECUs, and the plurality of cores 460 perform tasks of the plurality of slave ECUs.

In the fully-distributed mode 720, a specially allocated core of the communication ECU 300 merely executes only a unique task and the other cores are held in any one of the sleep mode, the monitoring mode and the semi-running mode. In the fully-distributed mode, the plurality of slave ECUs are in a driving mode and independently execute tasks allocated thereto.

In the semi-distributed mode 730, in the communication ECU 300, one or more slave ECUs are in the sleep mode, whereas some of the plurality of slave ECUs are not in the sleep mode. Namely, at least one of the plurality of slave ECUs is in the running mode of executing a task allocated thereto. The communication ECU 300 holds a main core in the running mode to execute a task, and holds one or more cores in the running mode to execute a task of a slave ECU being in the sleep mode.

In the redundant mode 740, the communication ECU 300 performs a task by holding the main core in the running mode. The communication ECU 300 holds one or more cores in the running mode, and the slave ECU is in an execution mode to redundantly execute the corresponding task. The communication ECU 300 may determine an operation based on results of the two duplicate tasks.

On the other hand, the main core described with reference to FIG. 10 may be described as a core for performing communication with an external device. For example, the main core may be at least one of the primary V2X module 440, the non-V2X connectivity module 450, the secondary V2X module 520 or the radio interface 550, described above.

Meanwhile, the power consumption reduction manager 430 may monitor power consumed in each mode and collect data. The power consumption reduction manager 430 optimally selects one of the non-distributed mode 710, the fully-distributed mode 720, the semi-distributed mode 730 and the redundant mode 740 to reduce power consumption. For example, in the non-distributed mode 710, all slave ECUs are turned off and functions thereof are executed by corresponding cores of the communication ECU 300. As a result, overall power consumption may be reduced by reducing a load of a CAN controller.

Figure 11:
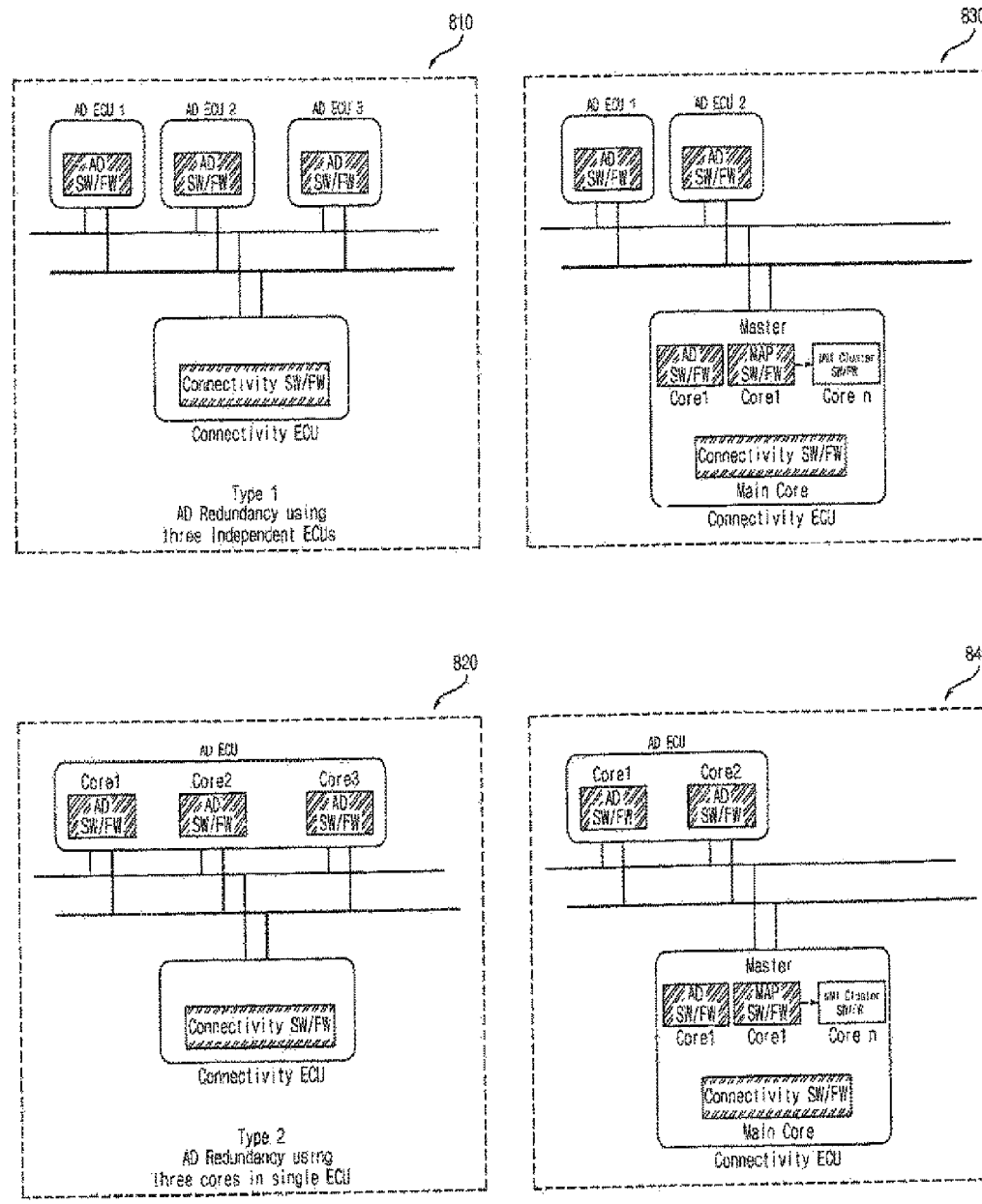

Referring to FIG. 11, in an automated driving (AD) system architecture, AD redundancy may be classified into the following four types.

A first type 810 is a system that assists redundancy through a plurality of AD ECUs which are connected to a vehicle bus to independently execute AD tasks. In this case, an AD operation may be performed using any one of a plurality of logics generated by the plurality of AD ECUs. The communication ECU does not perform the AD operation.

A second type 820 is a system that includes a plurality of cores which execute AD tasks, respectively, in a single AC ECU. In this case, an AD operation may be performed using any one of a plurality of logics generated by the plurality of cores. The communication ECU does not perform the AD operation.

A third type 830 is a system in which AD tasks are executed by at least one independent AD ECU connected to a vehicle bus and at least one of the plurality of cores included in the communication ECU.

A fourth type 840 is a system in which AD tasks are executed by at least one core included in a single AD ECU and at least one of the plurality of cores included in the communication ECU 300.

The present disclosure as described above may be implemented as computer-readable code on a program storage medium. The computer-readable medium may be any type of recording device in which data is stored in a computer-readable manner. The computer-readable medium may include, for example, a hard disk drive (HDD), a solid-state disk (SSD), a silicon disk drive (SDD), a read-only memory (ROM), a random access memory (RAM), a compact disc read-only memory (CD-ROM), a magnetic tape, a floppy disk, and an optical data storage device, as well as implementation as carrier waves (e.g., transmission over the Internet). In addition, the computer may include a processor or a controller. Accordingly, the above detailed description is not to be construed as limiting the present disclosure in any aspect, but is to be considered by way of example. The scope of the present disclosure should be determined by reasonable interpretation of the accompanying claims, and all equivalent modifications made without departing from the scope of the present disclosure should be understood as being included in the following claims.

DESCRIPTION OF REFERENCE NUMERAL

10: vehicle
300: communication ECU

The invention claimed is:

1. A communication electronic control unit (ECU) provided in a vehicle to be used for exchange of a signal with an external device, the communication ECU comprising:
   a bus interface configured to exchange signals with a plurality of slave ECUs in the vehicle;
   a primary processor configured to perform software cloning for at least one of the plurality of slave ECUs; and
   a secondary processor configured to determine whether to operate, based on whether overload is applied to the primary processor.

2. The communication ECU according to claim 1, wherein the primary processor performs the software cloning for a slave ECU in which a fault is detected among the plurality of slave ECUs.

3. The communication ECU according to claim 1, wherein the primary processor comprises a plurality of cores set to perform functions performed respectively by the plurality of slave ECUs.

4. The communication ECU according to claim 3, wherein the primary processor comprises:
   a first core set to perform a function performed by a first slave ECU; and
   a second core set to perform a function performed by a second slave ECU.

5. The communication ECU according to claim 4, wherein the primary processor activates the first core when a fault of the first slave ECU is detected.

6. The communication ECU according to claim 5, wherein the primary processor changes the first slave ECU to a sleep mode state when the fault of the first slave ECU is detected.

7. The communication ECU according to claim 3, wherein each of the plurality of cores is set to any one of a sleep mode defined as an inactive state of the core, a monitoring mode of monitoring a state of a matched slave ECU, a semi-running mode of performing only a specified algorithm, and a running mode of performing the same function as that of the matched slave ECU.

8. The communication ECU according to claim 7, wherein the primary processor operates in at least one of:
   a non-distributed mode of changing the plurality of slave ECUs to the sleep mode and performing all of the functions of the plurality of slave ECUs,
   a fully-distributed mode of executing only a specified function by a first core among the plurality of cores and holding the other cores in any one of the sleep mode, the monitoring mode and the semi-running mode,
   a semi-distributed mode of changing at least one of the plurality of slave ECUs to the sleep mode and performing the function of the slave ECU changed to the sleep mode, or
   a redundant mode of holding at least one of the plurality of cores in the running mode under a condition that the plurality of slave ECUs operate.

9. The communication ECU according to claim 1, wherein the secondary processor comprises a vehicle to everything (V2X) redundancy manager configured to monitor a load of the primary processor and perform a management operation such that the secondary processor performs a communication-associated function of exchanging a signal with the external device, on behalf of the primary processor, when the overload is applied to the primary processor.

10. The communication ECU according to claim 9, wherein the V2X redundancy manager performs the management operation such that the primary processor performs the communication-associated function when the overload to the primary processor is resolved.

11. The communication ECU according to claim 10, wherein:
the primary processor comprises a primary V2X module configured to perform the communication-associated function when the overload is not applied to the primary processor, and
the secondary processor comprises a secondary V2X module configured to instead perform an operation of the primary V2X module when the overload is applied to the primary processor.

12. The communication ECU according to claim 11, wherein the secondary processor further comprises a V2X data switch configured to control a flow of V2X data between the primary V2X module and the secondary V2X module.

13. The communication ECU according to claim 1, wherein the bus interface receives a plurality of sensor signals input respectively to the plurality of slave ECUs.

14. The communication ECU according to claim 1, wherein the primary processor comprises a power consumption reduction manager configured to monitor power consumption states of the plurality of slave ECUs.

* * * * *